(12) United States Patent
Vidmar

(10) Patent No.: US 8,739,376 B1
(45) Date of Patent: Jun. 3, 2014

(54) CV JOINT REMOVAL TOOL

(76) Inventor: Kenneth P. Vidmar, Virginia Beach, VA (US)

( * ) Notice: Subject to any disclaimer, the term of this patent is extended or adjusted under 35 U.S.C. 154(b) by 648 days.

(21) Appl. No.: 13/015,408

(22) Filed: Jan. 27, 2011

Related U.S. Application Data

(60) Provisional application No. 61/299,765, filed on Jan. 29, 2010.

(51) Int. Cl.
*B23P 19/04* (2006.01)
*B25B 27/00* (2006.01)
*B25B 27/14* (2006.01)
*B23P 19/00* (2006.01)
*B25B 1/00* (2006.01)

(52) U.S. Cl.
CPC ................ *B23P 19/00* (2013.01); *B23P 19/04* (2013.01); *B25B 27/00* (2013.01); *B25B 1/00* (2013.01)
USPC .................. 29/256; 29/260; 29/239; 29/270; 29/278

(58) Field of Classification Search
CPC ............ B23P 19/00; B25B 27/00; B25B 1/00
USPC ........... 29/256–260, 239, 270, 278; 269/902, 269/43
See application file for complete search history.

(56) References Cited

U.S. PATENT DOCUMENTS

| | | | | |
|---|---|---|---|---|
| 4,287,653 A | * | 9/1981 | Bloch | 29/256 |
| 4,579,322 A | * | 4/1986 | Schwarz | 269/70 |
| 5,067,219 A | * | 11/1991 | Ulmer | 29/252 |
| 6,266,860 B1 | * | 7/2001 | Kiebler | 29/259 |

* cited by examiner

*Primary Examiner* — Lee D Wilson
*Assistant Examiner* — Seahee Yoon
(74) *Attorney, Agent, or Firm* — Crossley Patent Law; Micah C. Gunn

(57) ABSTRACT

The CV joint removal tool's clamps surround an axle proximal to the CV joint to be separated from the axle. The tool clamps onto the axle and applies a constant axial force to separate the two CV joint components via the push plate and push rods. Removal of the entire axle assembly is negated, saving parts cost and labor costs. The tool does not require complete drive axle removal, as do other devices attempting the same function. The CV joint removal tool pushes the CV joint and the axle apart, further differentiating from previous methods and devices. The tool utilizes Newton's law of equal and opposite reactions. The key challenge that the CV joint removal tool overcomes is that when CV joints are installed, neither end of the drive axle is accessible.

14 Claims, 5 Drawing Sheets

CV JOINT REMOVAL TOOL

BACKGROUND OF THE INVENTION

Constant velocity joints are widely used to transmit rotary motion from one shaft to another in driving various mechanisms. Especially applicable are automobiles. The constant velocity joint, known as the CV joint enables the relative shafts to be disposed at varying angles. Consequently, CV joints are typically located between the drive axle and the hub as the device of choice for driving motorized vehicles. CV joints have become the preferred mechanism for accomplishing this task. Separation of a CV joint from an axle becomes necessary either for service or replacement or for access to other related automotive components. Replacement of a CV joint boot is a prime example wherein CV joint and axle separation can save hours of labor as well as parts cost. The use of impact devices is not always desirable as, for one reason, CV joint damage is possible. Further, CV joint accessibility can hamper or prohibit the use of impact devices. Therefore, a constant axial force with a relatively small, non-invasive tool is a preferred solution offered by the CV joint removal tool. The key challenge that the CV joint removal tool overcomes is that when CV joints are installed, neither end of the drive axle is accessible. Normal CV joint removal methods require removing the drive axle from the car/vehicle, while the CV joint removal tool eliminates the need to remove the drive axle from the car/vehicle.

FIELD OF THE INVENTION

The CV joint removal tool relates to automotive drive tools and more specifically to a constant velocity joint removal tool which separates a CV joint from an axle.

SUMMARY OF THE INVENTION

The general purpose of the CV joint removal tool, described subsequently in greater detail, is to provide a CV joint removal tool which has many novel features that result in an improved CV joint removal tool which is not anticipated, rendered obvious, suggested, or even implied by prior art, either alone or in combination thereof.

To accomplish this, the CV joint removal tool clamps surround an axle proximal to the CV joint to be separated from the axle. The tool clamps onto the axle and applies a constant axial force to separate the two CV joint components via the push plate and push rods. The axial force is applied by the tool attached to the axle. Removal of the entire axle assembly is thereby negated, saving parts cost and labor costs. The tool does not require complete drive axle removal, as do other devices attempting the same function. The CV joint removal tool pushes the CV joint and the axle apart, further differentiating from previous methods and devices. The tool utilizes Newton's law of equal and opposite reactions. The key challenge that the CV joint removal tool overcomes is that when CV joints are installed, neither end of the drive axle is accessible. Normal CV joint removal methods require removing the drive axle from the car/vehicle, while the CV joint removal tool eliminates the need to remove the drive axle from the car/vehicle. A push plate is provided to push pins through the extensions forward which make contact with the inner race of the CV joint to remove the CV joint from the axle.

The clamps and push plate are illustrated as each being substantially square, yet this is not a limitation. The push plate may be shaped otherwise, such as round, with the assembled clamps matching each chosen shape of the push plate. Multiple push plate bores may be utilized, with multiple threaded orifices disposed in the assembled clamps. Push plate bores may be elongated and numerous sets of clamp threaded orifices chosen to match push plate bore orientations around given axles. For example a chosen set of clamp orifices may best match one axle diameter, while another set of clamp orifices match another axle diameter. Elongation of push plate orifices may thereby automatically adjust the same tool to fit multiple axle diameters and various CV joint inner races.

Thus has been broadly outlined the more important features of the CV joint removal tool so that the detailed description thereof that follows may be better understood and in order that the present contribution to the art may be better appreciated.

An object of the CV joint removal tool is to save labor costs.

An object of the CV joint removal tool is to save parts costs.

Another object of the CV joint removal tool is to be easily applied.

A further object of the CV joint removal tool is to be easily removed.

An object of the CV joint removal tool is to be sufficiently compact to work in tight conditions.

Yet another object of the CV joint removal tool is to allow inexpensive production and sale.

These together with additional objects of the CV joint removal tool, along with various novel features that characterize the tool are particularly pointed out in the claims forming a part of this disclosure. For better understanding of the CV joint removal tool, its operating advantages and specific objects attained by its uses, refer to the accompanying drawings and description.

DETAILED DESCRIPTION OF THE DRAWINGS

With reference now to the drawings, and in particular FIGS. 1 through 4 thereof, example of the CV joint removal tool employing the principles and concepts of the CV joint removal tool and generally designated by the reference number 10 will be described.

Figure 1:
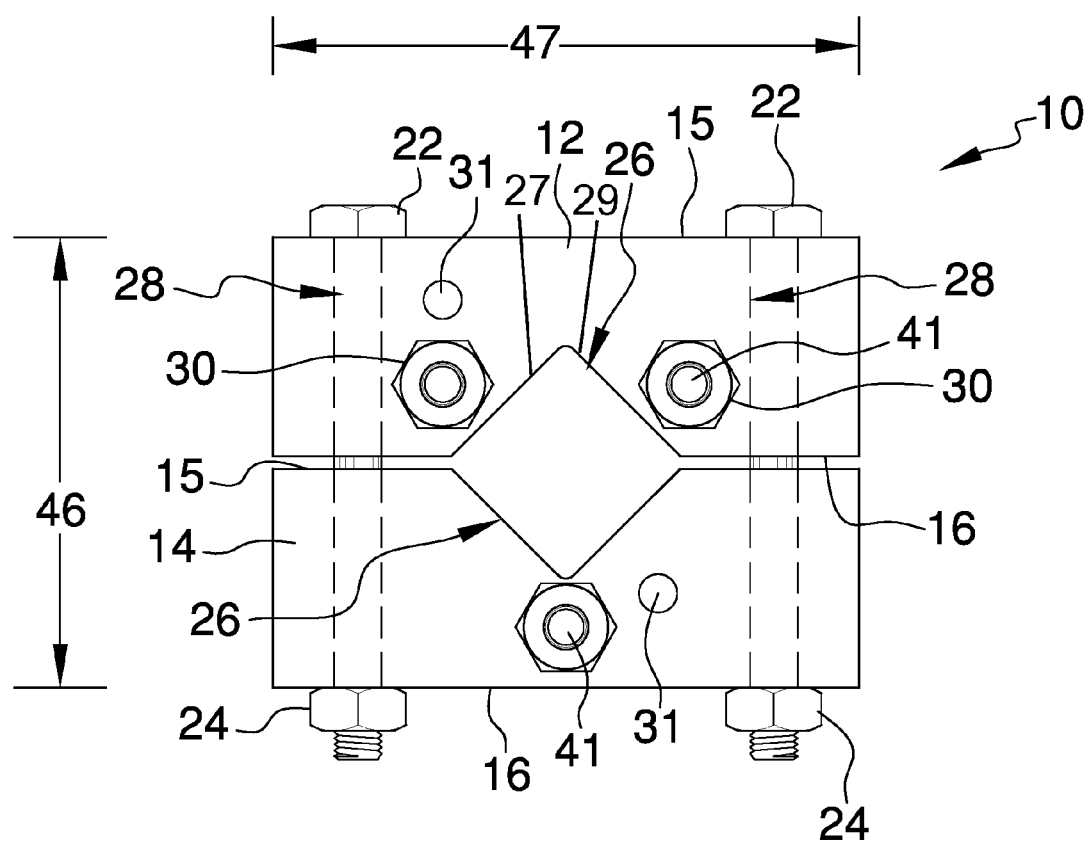
FIG. 1 is an elevation view of the CV joint facing side of the clamps.

Referring to FIG. 1, the tool 10 comprises a CV joint removal tool 10.

Figure 4A:
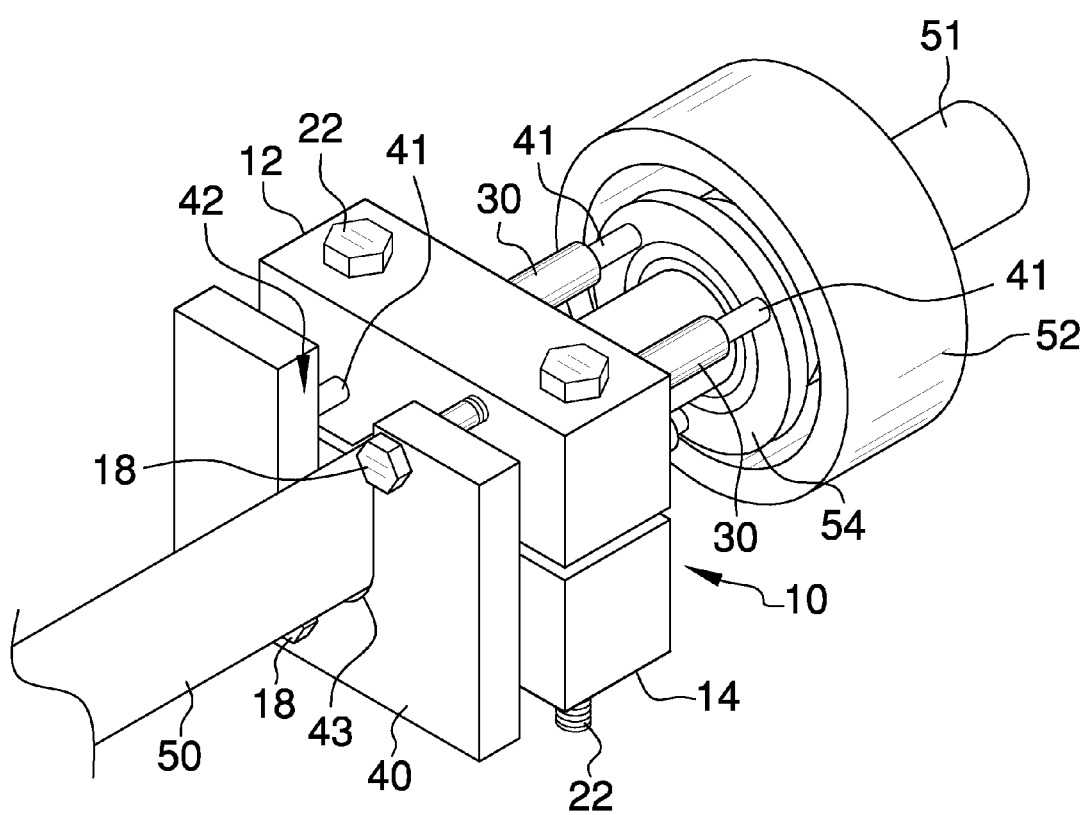
FIG. 4A is a perspective view of the tool in use in removing a CV joint from an axle, the push plate having the vertically disposed slot.

Referring to FIG. 4A, the tool 10 is used for separating a CV joint 52 with attached stub axle 51 from an axle 50.

Referring again to FIG. 1, the tool 10 partially comprises a parallelepiped top clamp 12. The top clamp 12 has a spaced apart top 15 and bottom 16, a width, and two spaced apart ends. A v-shaped groove 26 is disposed in the bottom 16 of the top clamp 12. The groove 26, in use, is placed coplanarly to the existing axle 50 length. The groove 26 removably receives a part of the axle 50. Two spaced apart orifices 28 are disposed in the top clamp 12. The orifices 28 pass from top 15 to bottom 16 of the top clamp 12. A threaded orifice 31 passes through a thickness of the top clamp 12. A pair of spaced apart extensions 30 is proximal to the groove 26. A bore 32 passes through the top clamp 12 and the extension 30. Each extension 30 faces a CV joint 52. The parallelepiped bottom clamp 14 is of a like shape and size and substantially a mirror image of the top clamp 12. The bottom clamp 14 has a spaced apart top 15 and bottom 16, a width, and two spaced apart ends. The v-shaped groove 26 is disposed in the top 15 of the bottom clamp 14.

Referring to FIG. 4A, the groove 26 is, in use, placed coplanarly to the axle 50 length. The groove 26 removably receives a part of the axle 50. Like the top clamp 12, two orifices 28 are disposed in the bottom clamp 14. Each orifice 28 passes from top 15 to bottom 16 of the bottom clamp 14. The bottom clamp 14 orifices align with the top clamp 12 orifices 28. A threaded orifice 31 passes through a thickness of the bottom clamp 14.

Figure 3:
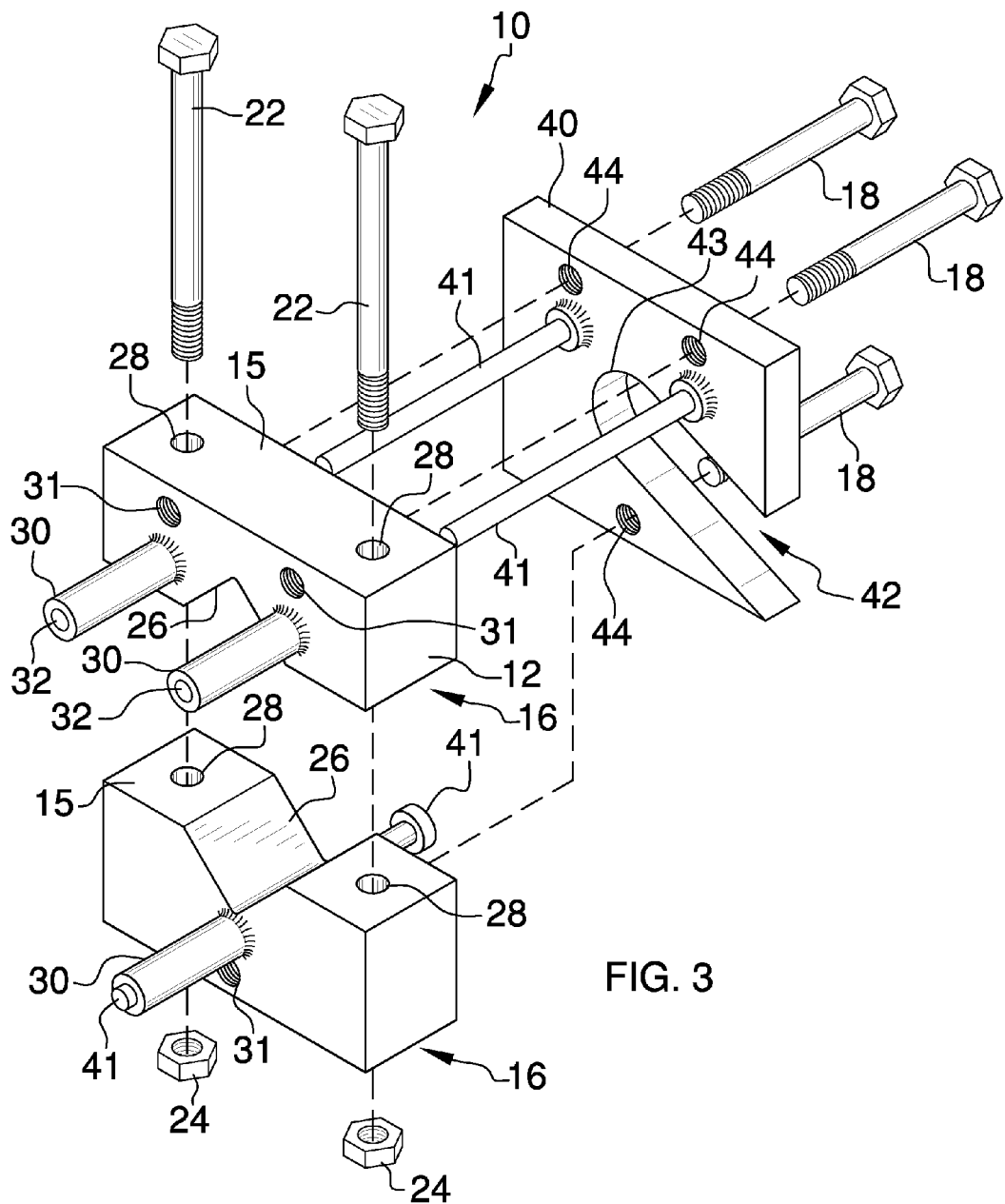
FIG. 3 is a perspective view, with angularly disposed push plate slot.

Referring to FIG. 3, the clamps may also contain more than one threaded orifice 31 each. When this occurs, the threaded orifices 31 are positioned such that they are equidistantly apart around a given existing axle 50. The bottom clamp 14 has a centrally disposed extension 30 with bore 32 passing through the extension 30 and the bottom clamp 14. In use, the extension 30 faces a CV joint 52 to be removed.

Referring again to FIG. 1, the tool 10 is presented in an elevation which faces a CV joint 52 to be removed.

Figure 2:
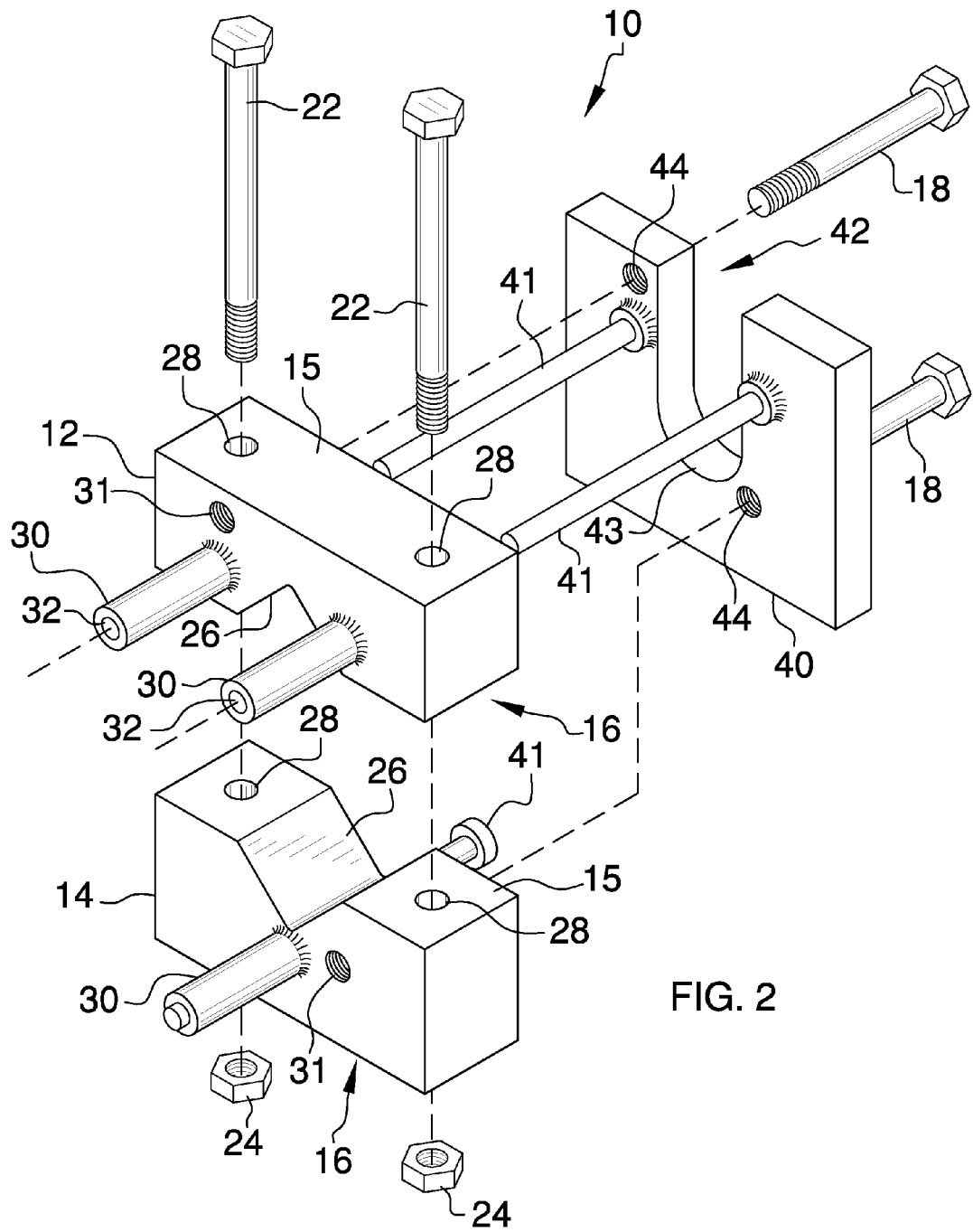
FIG. 2 is an exploded perspective view, with vertically disposed push plate slot.

Referring to FIG. 2, the push plate 40 is provided to be used in conjunction with the clamps.

Referring to FIG. 2 and FIG. 3, it is important to note that the slot 42 with rounded slot end 43 is not limited in its directional orientation within the push plate. It is further important to note that the number and relative location of push plate 40 foramens 44 and clamp threaded orifices 31 are designed to be aligned and used in conjunction, with removal bolts 18 passed through the foramen 44 of the push plate 40 and into the threaded orifices 31 of the clamps. The clamps when together or approximately together have a height 46 and a width 47 that approximates that of the push plate 40. Of further importance is that push rods 41 may be attached upwardly to the push plate 40, yet the lower used push rod 41 remains unattached. This attached and unattached push rod 41 arrangement may exist in any attached/unattached pattern.

Figure 4B:
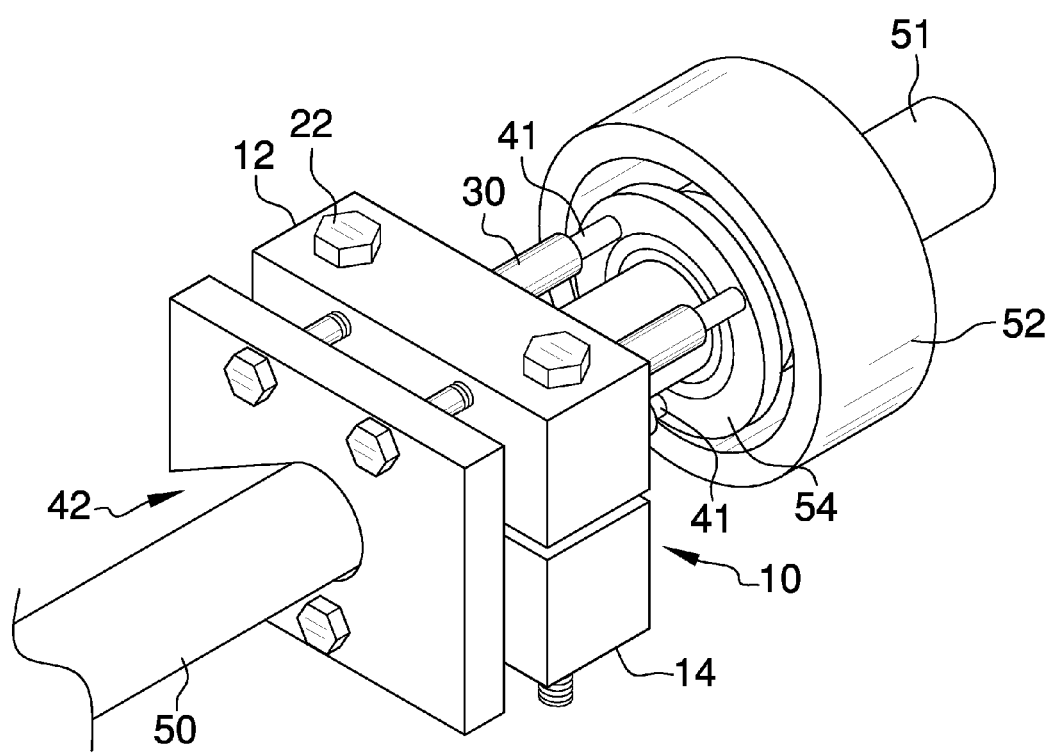
FIG. 4B is a perspective view of the tool in use in removing a CV joint from an axle, the push plate having the angularly disposed slot.

Referring to FIGS. 1, 4A, and 4B, the grooves 26 in each of the top clamp 12 and the bottom clamp 14 form a diamond via the v-shape of each groove 26. Each groove 26 has a first side 27 and a second side 29 disposed at a right angle to the first side 27. The clamp bolts 22 with nuts 24 tighten the clamps about an axle 50. It is important to note that the diamond formed by the clamps allow the tool 10 to be used more universally with varying sizes of axles 50. The clamps are clamped onto the axle 50, then the push plate 40 and push rods 41 are installed. The removal bolts 18 are tightened. This tightening forces the push rods 41 against the inner race 54 of a given CV joint 52 to force the CV joint 52 away from the tool 10 and off the drive axle 50. Also, foramen 44 through the push plate 40 may be oblong to assist in use as such provides alignment with the clamps in encountering various axle 50 diameters. Upon completion of use, the top clamp 12 is separated from the bottom clamp 14 by removing nuts 24 and the clamp bolts 22.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the CV joint removal tool may be used.

The invention claimed is:

1. A CV joint removal tool comprising, in combination:
   a pair of parallelepiped like shaped and sized clamps comprising a top clamp and a bottom clamp, each clamp having a top spaced apart from a bottom, a width, and two spaced apart sides;
   a v-shaped groove disposed centrally in the bottom of the top clamp;
   a pair of spaced apart orifices disposed in the top clamp, the orifices passing from top to bottom;
   a pair of spaced apart cylindrical extensions disposed proximal to the top clamp groove;
   a smooth bore passed through the top clamp and longitudinally through each extension;
   a threaded orifice passed through the width of the top clamp, the threaded orifice disposed slightly above one extension;
   a v-shaped groove centrally disposed in the top of the bottom clamp, the v-shaped groove disposed in each of the bottom of the top clamp and the top of the bottom clamp having a first side and a second side disposed at a right angle to the first side, wherein the v-shaped grooves collectively forming a diamond between the top clamp and the bottom clamp upon attachment of the top clamp and the bottom clamp to each other;
   a pair of orifices disposed in the bottom clamp, each orifice passed from top to bottom of the bottom clamp, the bottom clamp orifices selectively aligned with the top clamp orifices;
   a plurality of clamp bolts with nuts selectively fastening the top clamp to the bottom clamp;
   whereby the top clamp and bottom clamps surround an existing axle;
   an extension extended from the bottom clamp directly below the bottom clamp groove;
   a smooth bore passed through the width of the bottom clamp and longitudinally through the extension;
   a threaded orifice disposed through the bottom clamp slightly lateral to the extension;
   a parallelepiped push plate having a like shape and size to the assembled clamps;
   a slot disposed from proximal to the center through to an exterior of the push plate;
   a rounded slot end disposed within the slot;
   whereby the push plate may be substantially centrally and selectively disposed around the existing axle;
   a pair of spaced apart foramen disposed through the push plate, the foramen substantially in alignment with the threaded orifices of the assembled clamps;
   a trio of push rods removably passed through the clamp bores and abutted against the push plate;
   a plurality of removal bolts, one of each removal bolt selectively passed through one of each of the foramen of the push plate and into one of each of the threaded orifices of the clamps;
   whereby a tightening of the removal bolts forces the push rods deeper into the bores.

2. The tool according to claim 1 wherein the push plate slot further extends directly to a one parallelepiped side.

3. The tool according to claim 1 wherein the push plate slot further extends angularly across the push plate.

4. The tool according to claim 1 wherein at least one of the push rods is attached to the push plate.

5. The tool according to claim 2 wherein at least one of the push rods is attached to the push plate.

6. The tool according to claim 3 wherein at least one of the push rods is attached to the push plate.

7. A CV joint removal tool comprising, in combination:
a pair of parallelepiped like shaped and sized clamps comprising a top clamp and a bottom clamp, each clamp having a top spaced apart from a bottom, a width, and two spaced apart sides;
a v-shaped groove disposed centrally in the bottom of the top clamp;
a pair of spaced apart orifices disposed in the top clamp, the orifices passing from top to bottom;
a pair of spaced apart cylindrical extensions disposed proximal to the top clamp groove;
a smooth bore passed through the top clamp and longitudinally through the extension;
a pair of spaced apart threaded orifices passed through the width of the top clamp, each threaded orifice disposed slightly above one of the pair of extensions;
a v-shaped groove centrally disposed in the top of the bottom clamp, the v-shaped groove disposed in each of the bottom of the top clamp and the top of the bottom clamp having a first side and a second side disposed at a right angle to the first side, wherein the v-shaped grooves collectively forming a diamond between the top clamp and the bottom clamp upon attachment of the top clamp and the bottom clamp to each other;
a pair of orifices disposed in the bottom clamp, each orifice passed from top to bottom of the bottom clamp, the bottom clamp orifices selectively aligned with the top clamp orifices;
a plurality of clamp bolts with nuts selectively fastening the top clamp to the bottom clamp;
whereby the top clamp and bottom clamps surround an existing axle;
an extension extended from the bottom clamp directly below the bottom clamp groove;
a smooth bore passed through the width of the bottom clamp and longitudinally through the extension;
a threaded orifice disposed through the bottom clamp slightly lateral to the extension;
a parallelepiped push plate having a like shape and size to the assembled clamps;
a slot disposed from proximal to the center through to an exterior of the push plate;
a rounded slot end disposed within the slot;
whereby the push plate may be substantially centrally and selectively disposed around the existing axle;
a trio of spaced apart foramen disposed through the push plate, the foramen substantially in alignment with the threaded orifices of the assembled clamps;
a trio of push rods removably passed through the clamp bores and abutted against the push plate;
a plurality of removal bolts, one of each removal bolt selectively passed through one of each of the foramen of the push plate and into one of each of the threaded orifices of the clamps;
whereby a tightening of the removal bolts forces the push rods deeper into the bores.

8. The tool according to claim 7 wherein the push plate slot further extends directly to a one parallelepiped side.

9. The tool according to claim 7 wherein the push plate slot further extends angularly across the push plate.

10. The tool according to claim 7 wherein at least one of the push rods is attached to the push plate.

11. The tool according to claim 8 wherein at least one of the push rods is attached to the push plate.

12. The tool according to claim 9 wherein at least one of the push rods is attached to the push plate.

13. A CV joint removal tool comprising, in combination:
a pair of like shaped and sized clamps comprising a top clamp and a bottom clamp, each clamp having a top spaced apart from a bottom, a width, and two spaced apart sides;
a v-shaped groove disposed centrally in the bottom of the top clamp;
a pair of spaced apart orifices disposed in the top clamp, the orifices passing from top to bottom;
a pair of spaced apart threaded orifices passed through the width of the top clamp, each threaded orifice disposed slightly above one of a pair of spaced apart extensions;
the pair of spaced apart cylindrical extensions disposed proximal to the top clamp groove;
a smooth bore passed through the top clamp and longitudinally through each extension;
a v-shaped groove centrally disposed in the top of the bottom clamp, the v-shaped groove disposed in each of the bottom of the top clamp and the top of the bottom clamp having a first side and a second side disposed at a right angle to the first side, wherein the v-shaped grooves collectively forming a diamond between the top clamp and the bottom clamp upon attachment of the top clamp and the bottom clamp to each other;
a pair of orifices disposed in the bottom clamp, each orifice passed from top to bottom of the bottom clamp, the bottom clamp orifices selectively aligned with the top clamp orifices;
a pair of clamp bolts with nuts selectively fastening the top clamp to the bottom clamp via the orifices;
whereby the top clamp and bottom clamp surround an existing axle;
a pair of spaced apart extensions extended from the bottom clamp proximal to the bottom clamp groove;
a smooth bore passed through the width of the bottom clamp and longitudinally through each extension;
a pair of spaced apart threaded orifices passed through the width of the bottom clamp, each threaded orifice disposed slightly below one of the extensions;
a push plate having a like shape and size to the assembled clamps;
a slot disposed from proximal to the center through to an exterior of the push plate;
a rounded slot end disposed within the slot;
whereby the push plate may be substantially centrally and selectively disposed around the existing axle;
a plurality of spaced apart foramen disposed through the push plate, the foramen substantially in alignment with the threaded orifices of the assembled clamps;
a trio of push rods removably passed through the clamp bores and abutted against the push plate;
a plurality of removal bolts, one of each removal bolt selectively passed through one of each of the foramen of the push plate and into one of each of the threaded orifices of the clamps;
whereby a tightening of the removal bolts forces the push rods deeper into the bores.

14. The tool according to claim 13 wherein at least one of the push rods is attached to the push plate.

* * * * *